(12) United States Patent
Liebig

(10) Patent No.: US 7,033,420 B2
(45) Date of Patent: Apr. 25, 2006

(54) PROCESS AND APPARATUS FOR THE THERMAL DEGASSING OF THE WORKING MEDIUM OF A TWO-PHASE PROCESS

(75) Inventor: Erhard Liebig, Laufenburg (DE)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/798,576

(22) Filed: Mar. 12, 2004

(65) Prior Publication Data
US 2004/0187688 A1  Sep. 30, 2004

Related U.S. Application Data

(63) Continuation of application No. PCT/IB02/03563, filed on Sep. 2, 2002.

(30) Foreign Application Priority Data
Sep. 14, 2001  (CH) ..................... 1702/01

(51) Int. Cl.
*B01D 19/00* (2006.01)
*F01K 23/10* (2006.01)
(52) U.S. Cl. .................. 95/251; 95/252; 95/244; 96/218; 96/205; 122/7 R; 60/783; 60/784; 60/39.182
(58) Field of Classification Search ............ 60/772, 60/784, 783, 39.182; 122/7 R; 96/201, 96/205, 218; 95/246, 249, 252, 250, 251, 95/244
See application file for complete search history.

(56) References Cited

U.S. PATENT DOCUMENTS 6,041,588 A * 3/2000 Bruckner et al. ............ 60/772
6,089,013 A * 7/2000 Bruckner et al. ........ 60/39.182

FOREIGN PATENT DOCUMENTS

| DE | 195 12 466 C1 | 8/1996 |
| DE | 198 46 458 C1 | 3/2000 |
| EP | 0 400 370 A2 | 12/1990 |
| EP | 0 826 096 B1 | 3/1998 |
| JP | 55 109708 | 8/1980 |

* cited by examiner

*Primary Examiner*—Duane Smith
*Assistant Examiner*—Douglas J. Theisen
(74) *Attorney, Agent, or Firm*—Steptoe & Johnson LLP

(57) ABSTRACT

A process is disclosed for thermally degassing a condensate or feedwater by heating the condensate or feedwater in a feedwater vessel/degassing means, to which preheated condensate is fed and from which feedwater for heating surfaces heated in a heat recovery steam generator is removed. Structurally simple degassing, advantageous in thermal terms, is achieved by virtue of the fact that the condensate is preheated in a first condensate preheater, and that a partial stream of the preheated condensate, which is preheated further in a second condensate preheater, is used to heat the condensate or feedwater in the feedwater vessel/degassing means.

15 Claims, 1 Drawing Sheet

PROCESS AND APPARATUS FOR THE THERMAL DEGASSING OF THE WORKING MEDIUM OF A TWO-PHASE PROCESS

CROSS-REFERENCE TO RELATED APPLICATIONS

This application is a continuation of the U.S. National Stage designation of co-pending International Patent Application PCT/IB02/03563 filed Sep. 2, 2002, the entire content of which is expressly incorporated herein by reference thereto.

FIELD OF THE INVENTION

The present invention relates to a process and an apparatus for thermally degassing a working medium, which is in the form of a condensate or feedwater, of a two-phase process, in particular for degassing a preheated condensate.

BACKGROUND OF THE INVENTION

In a combined-cycle power plant having a gas turbine installation and a steam turbine installation, the hot exhaust gas from the gas turbine is fed to a heat recovery steam generator. The heat of this hot exhaust gas is utilized in the heat recovery steam generator to generate steam, which steam is used to operate a steam turbine installation. The heat recovery steam generator and steam turbine installation are in this case operated in a water/steam cycle. To close this cycle, the steam which has been expanded in the steam turbine installation is fed to a condenser, where it is condensed. The condensate is fed back to the heat recovery steam generator in order to be heated again, evaporated and possibly superheated.

The water/steam cycle, which substantially includes the heat recovery steam generator, the steam turbine installation, the condenser, the feedwater vessel/degassing means, as well as the pumps, connecting pipes, etc., is a system in which very high demands are imposed on the purity of the working medium, and a special water-chemical procedure is used to lower the levels of corrosion and deposits.

To make optimum use of the heat of the exhaust gas from the gas turbine, the heat recovery steam generator comprises up to three pressure stages for generating steam at different pressure levels. A pressure stage of this type therefore includes an economizer and evaporator and, depending on the specific installation or the steam generating process, also a steam drum and superheater.

To ensure correct chemical operation of the water/steam cycle, the working medium has to be degassed, which can be carried out, for example, by means of a thermal process. Degassing of the working medium is particularly important if the system was at ambient pressure and had been opened, i.e. after inspection and/or maintenance work or during cold starts. The degassing also requires particular attention during and after periods where large quantities of make-up water are used.

According to the prior art, the thermal degassing may take place either in the condenser, in the feedwater vessel/degassing means, or by means of a degassing means which has been fitted to the low-pressure drum. In particular the latter two variants require high investment costs on account of the additional components required. An additional factor in these variants is that they are disadvantageous in terms of energy on account of the need for heating steam for preheating a liquid which has been slightly supercooled (supercooling 5 to 20 K) to saturation temperature. The higher the pressure level of the degassing means, the greater this drawback becomes.

With regard to the thermal degassing of the working medium, it should be ensured that the use of heating heat for the degassing procedure takes place in accordance with the prevailing qualitative and quantitative requirements, in order to ensure that the overall efficiency of the installation is reduced as little as possible and only for a limited time.

If the systems are functioning perfectly and if the installations operating in the subatmospheric pressure range are properly sealed, it is not absolutely inevitable that degassing will be required throughout the entire operating time of the installation. For this reason, it is also not sensible to ensure permanent high-quality degassing with high investment costs and a constant power loss. Rather, it is more appropriate to use additional measures to ensure appropriate degassing in the event of special conditions or when time-limited procedures are being implemented, but to operate the installation without this additional degassing during normal operation.

With regard to the degassing in the feedwater vessel which is of relevance in the context of the present invention, reference is made in particular to EP 0 826 096, which describes a process and an apparatus for degassing a condensate. This document proposes that a condensate which has already been preheated but has been mixed with cold condensate be fed to the feedwater vessel for degassing, and that a partial stream of the same condensate, which has likewise been preheated but not mixed with cold condensate, be used as heating medium for the heating for the purposes of degassing. In this case, the condensate is preheated in a condensate preheater which is arranged in the exhaust-gas-side outlet region of the heat recovery steam generator. The condensate which has been degassed in this manner in the feedwater vessel can then be fed to the pressure stages of the heat recovery steam generator.

One drawback of this process in terms of energy is that a partial stream of the condensate which has already been preheated has to be cooled again by admixing cold condensate.

SUMMARY OF THE INVENTION

Accordingly, one object of the present invention is to provide a process for thermally degassing the working medium of a two-phase process and an apparatus for carrying out a process of this type which constitute an alternative to existing degassing processes which is of simple design, advantageous in terms of the overall efficiency and characterized by low investment costs. The working medium is in this case in the form of a condensate or feedwater. The invention deals in particular with processes and/or apparatuses in which condensate or feedwater is degassed in a feedwater vessel/degassing means to which preheated condensate is fed and from which feedwater for heating surfaces which are heated in a heat recovery steam generator is removed.

The present invention achieves this object by virtue of the fact that in a first step condensate is preheated, and part of this preheated condensate is branched off, preheated further in a second step, and then used to heat the feedwater vessel/degassing means which is used for degassing.

Consequently, the subject matter of the present invention is a process in which the condensate is preheated in a first condensate preheater, and in which a partial stream of the preheated condensate, which is preheated further in a second condensate preheater, is used to heat the condensate or feedwater in the feedwater vessel/degassing means.

The core idea of the invention therefore consists in using two-stage preheating to allow optimum use to be made, in a structurally simple way, of the residual heat which is present in the heat recovery steam generator at the exhaust-gas end. Moreover, the simplicity of the solution means that the investment costs are low compared to standard degassing variants.

According to a first preferred embodiment of the invention, the process is distinguished by the fact that the second condensate preheater is arranged in the heat recovery steam generator, upstream of the first condensate preheater with respect to exhaust gas flowing in the heat recovery steam generator.

According to a second preferred embodiment of the invention, the process is distinguished by the fact that the preheated condensate, before being introduced into the degassing means, is expanded in particular across a first control element, and that particularly preferably after the expansion the condensate is in the supercooled state, with supercooling preferably in the range from 5 to 20 K.

According to a third preferred embodiment of the process, the twice-preheated partial stream of the second condensate preheater is expanded, in particular across a second control element, before being introduced into the feedwater vessel. After the expansion, the condensate is preferably in the wet steam state. In particular the steam content, when the condensate is introduced into the feedwater, leads to optimum mixing and therefore to maximum expulsion of dissolved residual gas. This applies in particular if the condensate is introduced into the feedwater vessel using a nozzle tube, which is preferably arranged below the water surface. The thorough mixing of the feedwater which is thereby brought about under approximately saturated water conditions, together with the rapid heating of the condensate introduced via the degassing means, leads to optimum degassing conditions.

According to a further preferred embodiment of the process, it is possible for all the condensate to enter the feedwater vessel via the second condensate preheater as well, as a result of a first control element being closed. In this case, the installation can be operated with intermittent, discontinuous degassing, such that, for example, the degassing is only carried out when required, and consequently the losses in efficiency described in the introduction only occur temporarily.

The invention also relates to an apparatus for carrying out a process as outlined above, which apparatus is distinguished by the fact that a first condensate preheater is arranged downstream of the second condensate preheater, in terms of the exhaust gas flowing in the heat recovery steam generator, at the exhaust-gas end of the heat recovery steam generator, and that the outlet of the first condensate preheater has a branching point, one outlet of which is fed direct to the second condensate preheater, while its other outlet is fed to the degassing means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE shows a combined-cycle power plant with means for thermal degassing in the feedwater vessel/degassing means.

DETAILED DESCRIPTION OF THE PREFERRED EMBODIMENTS

Figure 1:
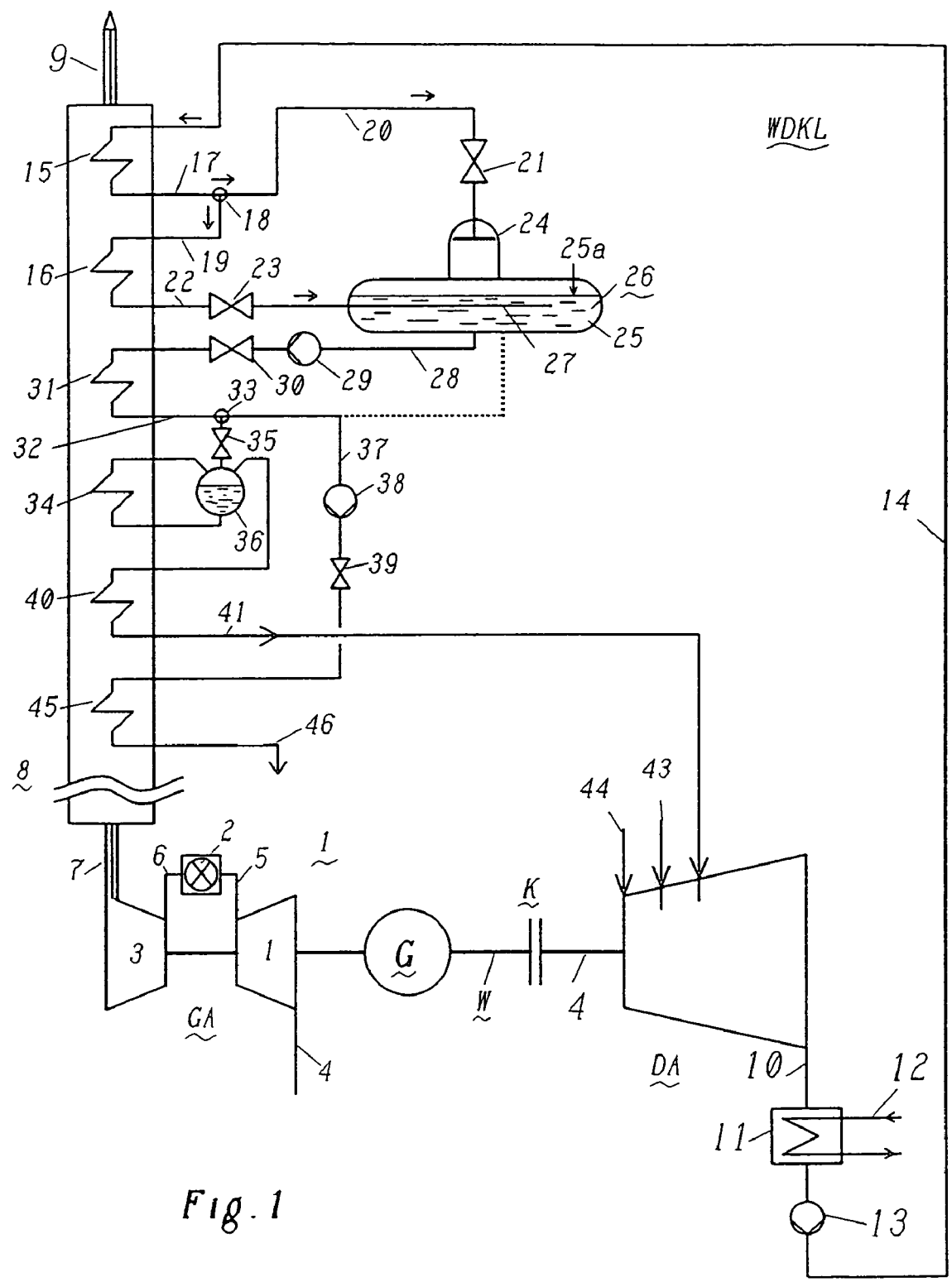

Referring now to the drawing, the FIGURE diagrammatically depicts a combined-cycle power plant, on the basis of which the configuration of the degassing in accordance with the invention is to be explained. In the present exemplary embodiment, to describe the apparatus and the process in some places identical reference symbols are used, for example, for a line (e.g. condensate line) and the medium which flows inside it (e.g. condensate). However, the person skilled in the art will recognize these differences without problems from the context in which they are used.

The installation illustrated the FIGURE is, by way of example, what is known as a single-shaft installation, in which the gas turbine installation GA and steam turbine installation DA together with the generator G are located on a single shaft W. The generator C is arranged between the gas turbine installation GA and steam turbine installation DA. The steam turbine installation DA can be disconnected from the generator G by means of the coupling K.

In a combined-cycle power plant, the heat which is contained in the exhaust gas 7 from the gas turbine 3 is used to generate steam in a heat recovery steam generator 8. The water which is fed to the heat recovery steam generator 8 is preheated in this heat recovery steam generator 8, evaporated and superheated if necessary. The steam which is generated in the heat recovery steam generator 8 is used to drive a steam turbine installation DA. The steam which is expanded in the steam turbine installation DA (exhaust steam 10) is condensed in the condenser 11 and fed back to the heat recovery steam generator 8.

In the present example, the gas turbine installation GA comprises a compressor 1, a combustion chamber 2 and a gas turbine 3. In the gas turbine installation GA, intake air 4 is compressed in a compressor 1 then fed as combustion air 5 to the combustion chamber 2, the hot gas 6 which is formed there is passed to the gas turbine 3 and expanded, delivering useful power. The exhaust gas 7 from the gas turbine 3 is fed to the heat recovery steam generator 8, where it is used to generate steam for operating the steam turbine installation DA. Downstream of the heat recovery steam generator 8, the exhaust gas 7 is released to the atmosphere via a stack 9.

The term gas turbine installation GA encompasses the compressor 1, the combustion chamber 2 and the gas turbine 3. A gas turbine installation may have a plurality of combustion chambers and a plurality of gas turbines. For example, in the case of gas turbine installations with sequential combustion, a low-pressure combustion chamber with low-pressure turbine is connected downstream of a high-pressure combustion chamber with high-pressure turbine. It is also possible for a gas turbine installation to have a plurality of compressors.

In the present case, the steam turbine installation DA is illustrated in simplified form as a steam turbine. In the specific case, it may be a multi-casing installation of numerous possible designs, comprising high-pressure, medium-pressure and low-pressure sections.

The heat recovery steam generator 8 is fed from the condenser 11 by means of the condensate pump 13 via the condensate line 14. In the heat recovery steam generator 8, the condensate is preheated in the condensate preheaters 15, 16 and then fed to the feedwater vessel/degassing means 26, 24.

In the exemplary embodiment which is outlined here, the degassing of the condensate takes place in a feedwater vessel/degassing means 26, 24 in combination with the split condensate preheater 15, 16. The condensate which is delivered into the heat recovery steam generator 8 by means of the condensate pump 13 is at a temperature of typically 20 to 45° C. (water-cooled condenser) or 30 to 55° C. (air-cooled condenser). This condensate is then preheated in a first stage of the condensate preheating, the first condensate preheater 15.

From this first stage of the condensate preheating, the first condensate preheater 15, the preheated condensate is passed via the condensate line 17 to a branching point 18. Here, the preheated condensate is in a first partial stream passed to the degassing means 24 via the condensate line 20 and a first control element 21 and in a second partial stream to a second stage of the condensate preheating, the second condensate preheater 16, via the condensate line 19. The condensate which has been preheated further in the condensate preheater 16 flows via the condensate line 22 and a second control element 23 into the feedwater vessel 26 via the nozzle tube 27.

The components degassing means 24 and feedwater vessel 26 have different functions during the degassing and/or storage of feedwater. In many current designs, the degassing means 24 and the feedwater vessel 26 form a single unit. For this reason, it is also possible to refer to the feedwater vessel/degassing means 26, 24.

The feedwater vessel 26 represents the interface between the condensate system and the feed system. For this reason, the liquid working medium upstream of the inlet into the feedwater vessel 26 is referred to as condensate. Therefore, the water which is trickling down to the inside of the degassing means 24 is also referred to as condensate. The working medium stored in the feedwater vessel 26 and the mass flow emerging from the feedwater vessel 26, by contrast, are referred to as feedwater.

In the present case, the thermal degassing of a liquid is based on a decreasing gas solubility as the temperature rises at constant pressure. In the saturated state, the gas solubility is zero. For efficient degassing of water, it is important to bring about the saturated state as quickly as possible from supercooling of approximately 5 to 20 K. This is advantageously realized by means of the heating medium steam inside a mixing preheater. For the gases to be expelled as completely as possible, the water should be kept in vigorous motion and should have the largest possible surface area with respect to the steam. This is achieved by distributing the water as finely as possible in the steam, or distributing the steam as finely as possible in the water.

The condensate which is fed to the degassing means 24 via the condensate line 20 is expanded to the pressure in the feedwater vessel/degassing means 26, 24 across the first control element 21. For effective degassing by heating the condensate to saturation temperature, supercooling in the range from 5 to 20 K should be ensured downstream of the first control element 21. The degassing means 24 may, for example, be a trickling degassing means. The degassing means 24 is fitted to the feedwater vessel 26, i.e. the condensate which enters the degassing means 24 trickles over internal fittings into the feedwater 25 stored in the feedwater vessel 26.

The twice-preheated condensate which flows out of the second stage of the condensate preheating, the second condensate preheater 16, via the condensate line 22 to the feedwater vessel 26 is likewise expanded to the pressure in the feedwater vessel/degassing means 26, 24, across the second control element 23. The temperature at the outlet from the second condensate preheater 16 can be controlled, as a function of the conditions in the feedwater vessel/degassing means 26, 24, in such a way that preferably wet steam is formed after the expansion in the second control element 23. From the second control element 23, the wet steam is fed to a nozzle tube 27, which nozzle tube 27 is arranged in the water part of the feedwater vessel 26. The nozzle tube 27 has a multiplicity of openings from which the wet steam emerges into the feedwater 25. The steam guarantees that the feedwater 25 inside the feedwater vessel 26 will be held at approximately saturation conditions combined, at the same time, with continuous, thorough mixing of the feedwater 25. The nozzle tube 27 is therefore preferably arranged below the water surface 25a of the feedwater 25.

The steam which emerges from the feedwater 25 flows in the opposite direction to the condensate which is trickling down via internal fittings in the degassing means 24, and in the process heats the condensate which is trickling down and is thereby condensed. The parameters of the mass flows are to be controlled in such a way that on the one hand the condensate which is trickling down into the feedwater vessel 26 reaches its saturation temperature and on the other hand the rising steam is condensed as fully as possible. The extraction of the expelled gases and of the residual steam, although not shown, takes place in the upper region of the degassing means 24.

The low-pressure (LP) systems of modern heat recovery steam generators operate with the evaporator/steam drum system typically in a pressure range from 5 to 7 bar (max. 10 bar), i.e. at a temperature level of 150 to 165° C. (max. 180° C.).

In terms of the states of the medium which it contains, the feedwater vessel/degassing means 26, 24 may be arranged between the pressure level of the condenser 11 and of the LP system. In extreme circumstances, the feedwater vessel/degassing means 26, 24 may be integrated in the condenser 11 or in the LP system, for example the steam drum 36. In practice, the feedwater vessel/degassing means 26, 24 will be arranged and operated either in the "slight superatmospheric pressure range" or in the "slight subatmospheric pressure range", depending primarily on the fuel used for the gas turbine installation and the overall design of the water/steam cycle. This can be achieved by suitably designing and configuring the installation, but also by means of recirculation and bypass systems.

The degassing is of particular importance if, for example, standstill periods or special operating modes (addition of make-up water) have led to an increased gas content in the water/steam cycle. During normal operation, it is if appropriate possible to dispense with degassing, in order to maximize the output.

If the installation is to be operated with discontinuous degassing, the first control element 21 is closed, for the purposes of operation without degassing. The entire condensate mass flow then also flows through the second stage of the condensate preheating, the second condensate preheater 16. In this case, the feedwater vessel/degassing means 26, 24 serves only to store preheated feedwater.

The degassed feedwater 25 stored in the feedwater vessel 26 is delivered to a branching point 33 by means of the feedwater pump 29, via the feedwater line 28 and the LP economizer 31. The feedwater mass flow is set by means of the control element 30. The feedwater which has been preheated in the LP economizer 31 (feedwater preheating) is fed to the LP steam drum 36 via the branching point 33 and the control element 35. The LP steam drum 36 is in communication with the LP evaporator 34. Furthermore, the LP steam drum 36 is followed by an LP superheater 40, to which the LP live steam line 41, which leads to the steam turbine installation DA, is connected.

Feedwater 46 can be delivered to further pressure stages of the heat recovery steam generator 8 from the branching point 33 or alternatively direct from the feedwater vessel 26, by means of a further feedwater pump 38 and via a further feedwater line 37, a further control element 39 and a further economizer 45. The steam which is generated in the further pressure stages of the heat recovery steam generator 8 is fed to the steam turbine installation DA via the corresponding high-pressure (HP) and/or medium-pressure (MP) live steam lines 44, 43. The steam undergoes work-performing expansion in the steam turbine installation DA. The exhaust steam 10 from the steam turbine installation DA is condensed in the condenser 11 with the aid of a cooling medium (water, air) 12. To close the cycle, the condensate is fed back to the heat recovery steam generator 8 by means of the condensate pump 13 and via the condensate line 14.

The LP economizer 31, the LP steam drum 36, the LP evaporator 34 and the LP superheater 40 together form an LP steam system operating at one pressure stage.

The pipe systems which are provided for transferring heat from the exhaust gas 7 from the gas turbine 3 to the feedwater or the steam in the heat recovery steam generator 8 (i.e. the economizer, evaporator, superheater) are referred to as heating surfaces.

The present case has described a heat recovery steam generator comprising a drum circulation evaporator. Therefore, the feedwater which has been preheated by the economizer is delivered into the steam drum. The drum water is circulated in the steam drum/evaporator system and a proportion of it is evaporated in the process. The separation of water and steam takes place in the steam drum. The water is fed back to the evaporator, while the steam passes to the steam turbine installation either directly or via a superheater which may optionally be present. The flow through the evaporator may be configured as a natural circulation or a forced circulation. In the case of forced circulation, by way of example, corresponding pumps are required. However, the individual pressure stages of the heat recovery steam generator may also be designed in accordance with the principle of the once-through forced circulation evaporator.

Of course, it is additionally possible for further systems which are not mentioned here to be present within the water/steam cycle. An optional recirculation system for increasing the condensate-side inlet temperature into the heat recovery steam generator should be mentioned for the region of the heat recovery steam generator, specifically the condensate preheater 15, in order to prevent corrosion on the exhaust gas side caused by the gases dropping below the dew point.

Finally, after it has flowed through the heat recovery steam generator 8, the exhaust gas 7 is released into the atmosphere via a stack 9.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

1 Compressor
2 Combustion chamber
3 Gas turbine
4 Intake air
5 Combustion air
6 Hot gas
7 Exhaust gas
8 Heat recovery steam generator
9 Stack
10 Exhaust steam
11 Condenser
12 Cooling medium
13 Condensate pump
14 Condensate line, condensate
15 First condensate preheater, first stage
16 Second condensate preheater, second stage
17 Condensate line
18 Branching point (to the second condensate preheater 16 and to the degassing means 24)
19 Condensate line (to the second condensate preheater 16), partial stream of the condensate, condensate
20 Condensate line (to the degassing means 24), partial stream of the condensate, preheated condensate
21 First control element
22 Condensate line (to the feedwater vessel 26), twice-preheated condensate
23 Second control element
24 Degassing means
25 Feedwater (in the feedwater vessel 26)
25a Water level/water surface of the feedwater (in the feedwater vessel 26)
26 Feedwater vessel
27 Nozzle tube
28 Feedwater line (to the LP economizer 31), feedwater
29 Feedwater pump
30 Control element
31 LP economizer (feedwater preheater)
32 Feedwater line (to the branching point 33)
33 Branching point (to the LP steam drum 36 and further pressure stages)
34 LP evaporator
35 Control element
36 LP steam drum
37 Feedwater line (to further pressure stages)
38 Feedwater pump
39 Control element
40 LP superheater
41 LP live steam line
43 MP live steam line
44 HP live steam line
45 Economizer (feedwater preheater)
46 Feedwater line (to further pressure stages), feedwater
GA Gas turbine installation
DA Steam turbine installation
G Generator
W Shaft
K Coupling
WDKL Water/steam cycle

What is claimed is:
1. A method for thermally degassing a working fluid of a two-phase working cycle, the method comprising:
preheating a condensate mass flow;
feeding preheated condensate into feedwater tank/degaser means, extracting a feedwater mass flow from the feedwater tank/degaser means and feeding said feedwater mass flow to heating surfaces located in a heat recovery steam generator;

preheating the condensate mass flow in a first condensate preheater;

further preheating a condensate flow fraction of the preheated condensate mass flow in a second condensate preheater;

feeding residual condensate mass flow into the feedwater tank/degaser means; and introducing the condensate flow fraction into the feedwater tank/degaser means, thus heating the working fluid in the feedwater tank/degaser means with said condensate flow fraction.

2. The method of claim 1, wherein the second condensate preheater is arranged in the heat recovery steam generator upstream of the first condensate preheater in the flow direction of exhaust gases flowing through the heat recovery steam generator.

3. The method of claim 1, further comprising:
expanding the residual condensate mass flow prior to the feeding into the feedwater tank/degaser means, thus maintaining condensate thereof below boiling point.

4. The method of claim 3, further comprising:
maintaining the condensate entering the feedwater tank/degaser means at 5 K through 20 K below the boiling point.

5. The method of claim 3, further comprising:
expanding the condensate while flowing through a first control element.

6. The method of claim 1, further comprising:
expanding the condensate flow fraction after preheating in the second condensate preheater before feeding the condensate flow fraction into the feedwater tank/degaser means.

7. The method of claim 6, further comprising:
expanding the condensate flow fraction into a wet steam state.

8. The method of claim 6, further comprising:
expanding the condensate flow fraction while flowing through a second control element.

9. The method of claim 1, further comprising:
introducing the condensate flow fraction into the feedwater tank/degaser means through a nozzle tube arranged below a liquid fluid surface in the feedwater tank/degaser means.

10. The method of claim 1, further comprising:
alternately opening and closing a first control element to temporarily block residual condensate mass flow.

11. The method of claim 1, wherein the working cycle is used in a water-steam-cycle of a combined cycle power plant, said power plant comprising at least one gas turbo group and a least one steam turbine plant.

12. A degassing device comprising a first condensate preheater, a second condensate preheater, and a connection line leading from the first condensate preheater to the second condensate preheater, and a feedwater tank/degaser means having a first fluid inlet and a heating fluid inlet, a first line branching off between the first condensate preheater and the second condensate preheater and leading to the first fluid inlet, and a second line leading from the second condensate preheater to the heating fluid inlet.

13. The device of claim 12, wherein the degaser means is arranged on top of the feedwater tank and is configured as a trickling degaser means.

14. The device of claim 12, wherein the first condensate preheater and the second condensate preheater are arranged in a heat recovery steam generator, and the first condensate preheater is arranged downstream of the second condensate preheater in the direction of flue gases flowing through the heat recovery steam generator.

15. The device of claim 12, further comprising a control means arranged in the first line.

* * * * *